United States Patent
Wüster

[11] Patent Number: 5,700,689
[45] Date of Patent: Dec. 23, 1997

[54] VENTILATED COMPOSTER

[76] Inventor: Heinrich Wüster, Unterm Hohen Rain 16, A-6460 Imst, Austria

[21] Appl. No.: 433,424

[22] PCT Filed: Sep. 5, 1994

[86] PCT No.: PCT/AT94/00124

§ 371 Date: Apr. 28, 1995

§ 102(e) Date: Apr. 28, 1995

[87] PCT Pub. No.: WO95/06624

PCT Pub. Date: Mar. 9, 1995

[30] Foreign Application Priority Data

Sep. 3, 1993 [AT] Austria ................................. 1780/93

[51] Int. Cl.⁶ .......................... B65D 25/00; B65D 90/02
[52] U.S. Cl. ................. 435/290.1; 220/601; 220/661; 220/674; 220/676
[58] Field of Search ........................ 220/676, 669, 220/674, 675, 913, 601, 661; 435/290.1

[56] References Cited

U.S. PATENT DOCUMENTS

| | | | |
|---|---|---|---|
| D. 332,678 | 1/1993 | Barclay et al. | D34/1 |
| 5,190,572 | 3/1993 | Long | 71/9 |
| 5,234,833 | 8/1993 | Artis | 435/299 |

FOREIGN PATENT DOCUMENTS

| | | |
|---|---|---|
| 0 094 094 | 11/1983 | European Pat. Off. . |
| 0 538 579 | 4/1993 | European Pat. Off. . |
| 30 19 253 | 11/1981 | Germany . |
| 288 148 | 3/1991 | Germany . |
| 41 05 778 | 8/1992 | Germany . |
| 41 28 189 | 4/1993 | Germany . |
| WO92/04303 | 3/1992 | WIPO . |

Primary Examiner—Allan N. Shoap
Assistant Examiner—Niki M. Kopsidas
Attorney, Agent, or Firm—Collard & Roe, PC

[57] ABSTRACT

In an apparatus for making compost, which apparatus comprises a preferably upwardly tapering container (1), which is adapted to be vented at its top and has an upper charging opening (4), which can preferably be closed by a cover (3) and which serves to receive the material to be composted, also a lower discharge opening (7), which can preferably be closed by a flap (6) and which permits the compost to be taken out, a plurality of lower ventilating openings (9), which extend through the container wall (5), and a plurality of air-guiding elements (10), which are provided on the inside surface of the container wall (5) and serve to guide the supply air, which enters through the ventilating openings (9) and flows along the inside surface of the container wall (5). The air guiding elements (10, 12, 13, 15) on the inside surface of the container wall (5) define a flow passage labyrinth, which the air flow along the container wall (5).

12 Claims, 1 Drawing Sheet

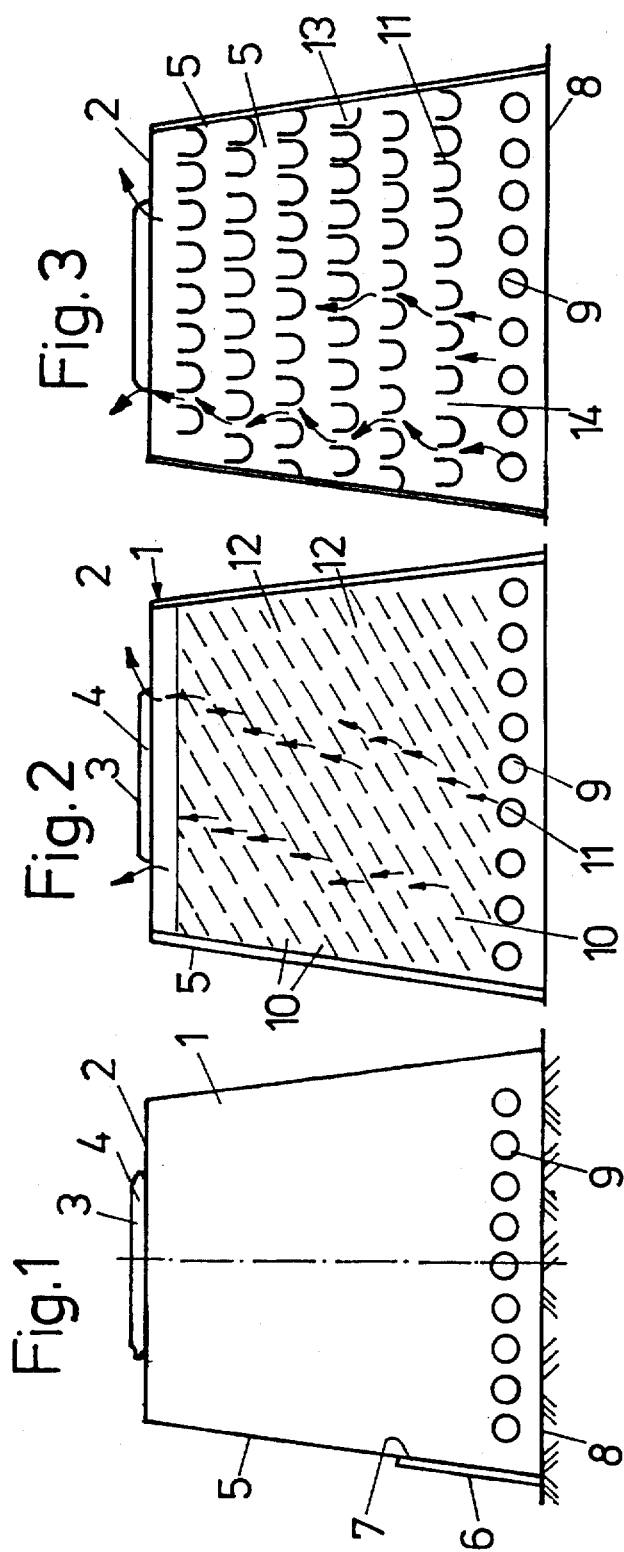
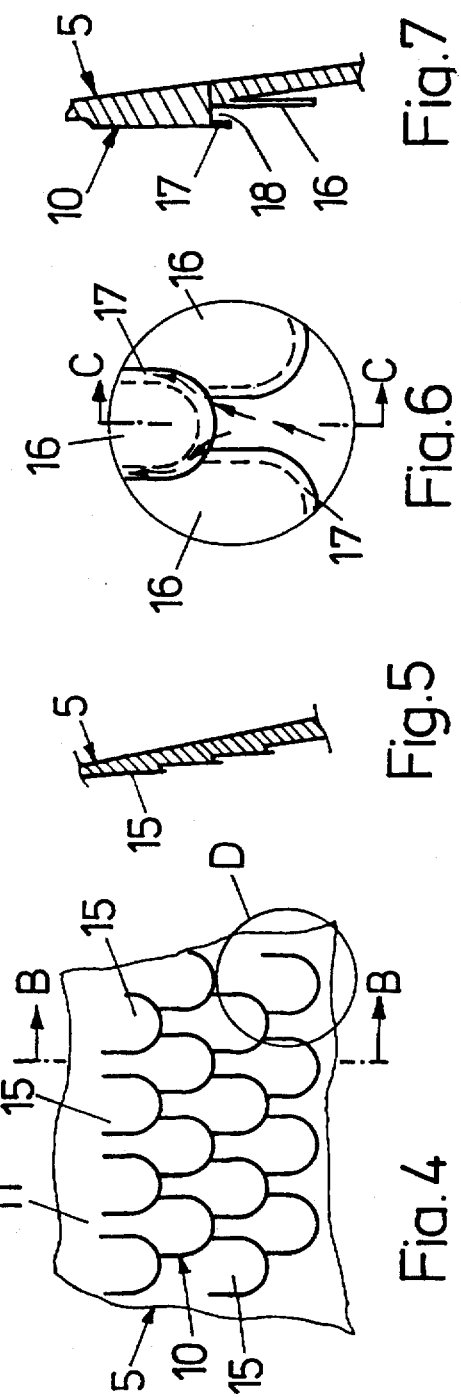

VENTILATED COMPOSTER

This invention relates to devices for making compost, particularly for composting garden and kitchen refuse.

Most known devices of that kind consist of single-walled containers which are substantially cylindrical or are square in cross-section and have container walls formed with openings through which oxygen is to be supplied to the material being composted and water vapor formed during the composting process is to be removed at the same time in order to avoid putrefaction or unpleasant odors. This can be only incompletely achieved in most cases because the waste materials to be composted form lumps and so closely contact the inside surface of the container walls that the required ventilation cannot be effected.

DE 30 19 253 A1 discloses a double-walled composting apparatus which has a closed cylindrical outer shell, which is provided with inwardly directed, thin vertical ribs, and a cylindrical inner shell, which consists of a wire grid, which is spaced 2 to 5 cm from the outer shell. In that apparatus the charging opening provided at the top end of the two shells and serving to receive the material to be composted is covered by a flexible plastic film and the compost cannot be taken out until the two shells have been removed.

DE 41 28 189 C1 discloses a composting apparatus that comprises a substantially pyramid-shaped container, which can be vented at its top and has an upper charging opening. The container to receive the material to be composted and can be closed by a cover. Compost can be taken out through a lower discharge opening, which can be closed by a flap, and a plurality of lower ventilating openings extend through the container wall. Thin vertical ribs protrude inwardly from the container wall and define laterally confined, wide vertical flow passages, leading into each other and serving to conduct the air which enters through the ventilating openings to flow along the inside surface of the container wall.

In said known composting devices the presence of the vertical flow passages results only in a slight improvement of the composting conditions because the heat which is generated in the material being composted during the composting process and the solar heat which is received by the container wall generate in the vertical flow passages an intense rising flow of air at a relatively high velocity of flow and the air that enters through the lower ventilating openings is relatively quickly conducted in said flow passages past the material being composted to the top vent of the container. As a result, the heat which is essential for the proper progress of the composting process is continuously dissipated. To destroy weed seeds during the composting it is recommended that a temperature of at least 60° C. should be reached during the composting process. The intense flow of air at the outside portions of the material being composted will also result in a drying of the material being composted. It has been found that even at outdoor temperatures which are normal in Central Europe the composting process will strongly be retarded by an intense circulation of air and will entirely be suppressed by such circulation when the weather is cool.

It is an object of the invention to eliminate said disadvantages and to provide a composting device in which the ventilation, while providing for the necessary supply of oxygen, will avoid as far as possible a cooling and drying of the material being composted.

This is accomplished according to the invention with a composting device which comprises a preferably upwardly tapering container, adapted to be vented at its top and having an upper charging opening, which can preferably be closed by a cover and which serves to receive the material to be composted. The container also has a lower discharge opening, which can preferably be closed by a flap and which permits the compost to be taken out, a plurality of lower ventilating openings, which extend through the container wall, and a plurality of air-guiding elements, which are provided on the inside surface of the container wall and serve to guide the air, which enters through the ventilating openings and flows along the inside surface of the container wall. The air guiding elements form a flow passage labyrinth which brakes the air flow along the inside surface of the container wall.

The design of the present invention design has the result that the air entering through the ventilating openings flows at a very low velocity along the inside surface of the container wall and intensely contacts the material being composted so that the air flowing through the container is more intensely utilized to deliver oxygen to the material being composted and to absorb water vapor from the material being composted so that a flow of air through the container at a much lower rate will be sufficient for a proper composting. At the same time, the decrease of the air flow velocity and the decrease of the required air volume will also decrease the heat which by the air flowing through the container is dissipated from the material being composted. Besides, the air-guiding elements constituting the flow passage labyrinth the air guiding elements constitute spacers for the material to be composted, so that a good thermal insulation is provided for the container wall which on its inside surface is provided with the flow passage labyrinth in accordance with the invention.

According to a further feature of the invention, the flow-guiding elements are arranged in superposed rows and an air-guiding element of the next row is arranged to form a deflector above a short flow passage defined between two adjacent air-guiding elements of the lower row.

According to a further feature of the invention, bosses projecting from the inside surface of the container wall into the interior of the container and/or flow-guiding members contacting the inside surface of the container wall are provided as air-guiding elements which constitute the flow passage labyrinth. With that design, each container wall may consist of a single wall or of two walls. Double-walled container walls may comprise, e.g., an outer shell having a smooth inside surface, and a thin-walled ner shell, which contacts said inside surface and comprises the flow-guiding members which constitute the flow passage labyrinth and is joined to the outer shell by adhesive bonding or snap joints.

According to a further feature of the invention, the air-guiding elements consist of elongate short ribs, which are arranged in oblique and/or horizontal rows.

According to a further feature of the invention, the bosses projecting from the inside surface of the container wall into the interior of the container are provided with edge portions, by which the flow passages defining said bosses are covered at least in part.

The invention will now be explained more in detail with reference to illustrative embodiments of composting containers shown in the drawings. In the drawings, FIG. 1 is a side elevation showing a composting container, FIG. 2 is a sectional view showing a first embodiment of a composting container provided on the inside surface of its side walls with a flow passage labyrinth for guiding the air flow, FIG. 3 is a sectional view showing a composting container provided with another embodiment of the flow passage labyrinth on the inside surface of its side walls, FIG. 4 is a side elevation showing a portion of a side wall of a container provided with a further embodiment of the flow passage labyrinth, FIG. 5 is a sectional view taken on line B—B in FIG. 4, FIG. 6 shows on a larger scale the detail D in FIG. 4, and FIG. 7 is a sectional view taken on line C—C in FIG. 6.

The composting device in accordance with the invention comprises an open-bottomed container 1, which is circular or square in a top plan view and is upwardly tapered and at its top end comprises a horizontal top wall 2, which is formed with a charging opening 4, which can be closed by a cover 3 and serves to receive the material to be composted. The side wall 5 of the container is formed with a lower discharge opening 7, which can be closed by a flap 6 and through which the compost can be taken out. Close to the bottom edge 8 of the container wall 5, the latter is provided with a plurality of circular or oval ventilating openings 9, which are distributed along that edge and extend through the container wall 5.

As shown in FIG. 2, air guiding elements 10 are provided on the inside surface of the container wall 5 and constitute an air passage labyrinth for the air, which enters through the ventilating openings 9 and flows along the inside of the container wall. The flow passage labyrinth brakes the air passing therethrough.

The air-guiding elements 10 are spaced apart and arranged in superposed horizontal or oblique rows. A substantially vertical short flow passage 11 is formed between two adjacent air-guiding elements 10 of a row and is laterally defined by the air-guiding elements 10. An air-guiding element 10 of the next adjacent row is provided above the top end of said flow passage and acts as a deflector for the air which rises in the flow passage 11.

In the illustrative embodiment shown in FIG. 2 the air-guiding elements 10 consist of elongate short ribs 12, which protrude inwardly from the container wall 5 and extend obliquely with respect to the horizontal. The ribs of each of the superposed rows are staggered from the ribs 12 of the adjacent rows. The arrangement of the ribs 12 is only schematically shown in FIG. 2. The length, width, and height of the ribs 12 and the distances between individual ribs of a row and also the spacing of the rows will determine the size and the course of the short flow passages 11 in the individual rows. The desired braking action of the flow passage labyrinth can be determined by a suitable selection of said dimensions.

In the illustrative embodiment shown in FIG. 3 the air-guiding elements 10 consist of scalelike bosses 13, which protrude inwardly from the container wall 5 and like tiles of a roof are arranged in superposed rows. Two adjacent bosses 13 define a substantially vertically extending flow passage 14, and a boss 13 of the next row is provided above the top end of said flow passage 14 as a deflector for the air which flows through the flow passage.

FIGS. 4 to 6 show a flow passage labyrinth, which brakes the air flow along the inside surface of the container wall 5 and in which the air-guiding elements 10 consist of scale like boss 15, which protrude inwardly from the container wall. Each boss 15 has a surface facing the interior of the container and a scalelike plate 16 on the surface of the boss has edge portion 17, which laterally protrudes beyond the lateral boundary of the boss 15 and defines an undercut flow passage 18 along the lateral boundary of the boss 15. The bosses 15 provided with the laterally protruding plates 16 are staggered in overlapping rows so that the flow passage 11 defined by two adjacent bosses 15 of one row opens upwardly directly into the underside of the undercut flow passage 18 which extends along the lateral boundary of the offset boss 15 of the next upper row.

In the embodiment of the air flow-braking flow passage labyrinth shown in FIGS. 4 to 7 the fact that the flow passages 11, 18 are partly covered ensures that said flow passages will not be clogged by small particles of the material being composted even if the material being composted settles in the container 1 during the composting process. Because the flow passages are partly covered and/or because the scalelike bosses are broader than narrow ribs, the material being composted can more easily settle and can be more easily compacted during the composting process carried out in the lower part of the container 1.

Whereas the flow passage labyrinth provided in accordance with the invention and serving to brake the air flow is constituted in the illustrative embodiments described hereinbefore by the ribs, bosses or projections which are integral with the associated container wall, said flow passage labyrinth may be constituted in a further illustrative embodiment of the invention by an inner shell, which contacts the smooth inside surface of and is secured to a container wall and comprises flow-guiding members, which contact the smooth inside surface of the container wall and constitute the flow passage labyrinth. In that embodiment of the composting apparatus the container consists of a thin-wall ed outer shell of plastic, which has a smooth inside surface and has been manufactured in a first manufacturing operation, and a thin-walled inner shell, which has been made in a second manufacturing operation and is provided with riblike or scalelike or different air-guiding elements, which are integrally formed with the inner shell and are shaped like those of the previously described illustrative embodiments. That inner shell may be integral for all container walls or may consist of a separate inner wall element for each container wall. Each hollow inner wall element is joined to the outer container wall element or to the outer shell of the container by adhesive bonding or snap joints or other positive connecting means. The resulting container walls consist of dimensionally stable sandwich elements composed of thin-wall ed wall elements, which can be made at low cost, and because said container walls are double-walled, they have an excellent heat insulation.

I claim:

1. A composting device comprising an open-bottomed container having a top end, a bottom end and a side wall extending between the top end and the bottom end, the container having openings to allow venting at the top end, the container comprising (a) a charging opening at the top end for charging material to be composted into the container, (b) a discharge opening at the bottom end for discharging compost from the container, (c) a plurality of venting openings in the side wall at the bottom end, and (d) a plurality of air-guiding scale-like bosses projecting inwardly from an inner surface of the side wall to form a labyrinth of air flow passages defined therebetween for air entering through the venting openings and flowing along the inner side wall surface while the air-guiding bosses forming the labyrinth brake the air flow, (1) the air-guiding bosses being arranged in superposed rows, two adjacent ones of the air-guiding bosses in each row respectively defining therebetween short sections of the labyrinth of air flow passages, and a respective one of the air-guiding bosses in a superposed row being arranged above a respective one of the short sections to form a deflector for the air flowing therethrough.

2. The composting device of claim 1, wherein the side wall is tapered inwardly from the bottom and to the top end.

3. The composting device of claim 1, further comprising a cover arranged over the charging opening.

4. The composting device of claim 1, further comprising a flap arranged over the discharge opening.

5. A composting device comprising an open-bottomed container having a top end, a bottom end and a side wall extending between the top end and the bottom end, the container having opening to allow venting at the top end, the container comprising (a) a charging opening at the top end for charging material to be composted into the container, (b) a discharge opening at the bottom end for discharging compost from the container, (c) a plurality of venting openings in the side wall at the bottom end, and (d) a plurality of air-guiding bosses projecting inwardly from an inner surface of the side wall to form a labyrinth of air flow passages defined therebetween for air entering through the venting openings and flowing along the inner side wall surface while the air-guiding bosses forming the labyrinth brake the air flow, (1) the air-guiding bosses being arranged in superposed rows, two adjacent ones of the air-guiding bosses in each row respectively defining therebetween short sections of the labyrinth of air flow passages, and a respective one of the air-guiding bosses in a superposed row being arranged above a respective one of the short sections to form a deflector for the air flowing therethrough, and (2) the air-guiding bosses having laterally projecting edge portions at least partially spanning the air flow passages defined between the bosses.

6. The composting device of claim 5, wherein the side wall is tapered inwardly from the bottom end to the top end.

7. The composting device of claim 5, further comprising a cover arranged over the charging opening.

8. The composting device of claim 5, further comprising a flap arranged over the discharge opening.

9. A composting device comprising an open-bottomed container having a top end, a bottom end and a side wall extending between the top end and the bottom end, the container having opening to allow venting at the top end, the container comprising (a) a charging opening at the top end for charging material to be composted into the container, (b) a discharge opening at the bottom end for discharging compost from the container, (c) a plurality of venting openings in the side wall at the bottom end, and (d) a plurality of air-guiding bosses projecting inwardly from an inner surface of the side wall to form a labyrinth of air flow passages defined therebetween for air entering through the venting openings and flowing along the inner side wall surface while the air-guiding bosses forming the labyrinth brake the air flow, (1) the air-guiding bosses being arranged in obliquely extending superposed rows, two adjacent ones of the air-guiding bosses in each row respectively defining therebetween short sections of the labyrinth of air flow passages, and a respective one of the air-guiding bosses in a superposed row being arranged above a respective one of the short sections to form a deflector for the air flowing therethrough.

10. The composting device of claim 9, wherein the side wall is tapered inwardly from the bottom end to the top end.

11. The composting device of claim 9, further comprising a cover arranged over the charging opening.

12. The composting device of claim 9, further comprising a flap arranged over the discharge opening.

* * * * *